April 15, 1947.  C. S. KING  2,419,148
MANUFACTURE OF SODIUM TRIPHOSPHATES
Filed Aug. 16, 1944
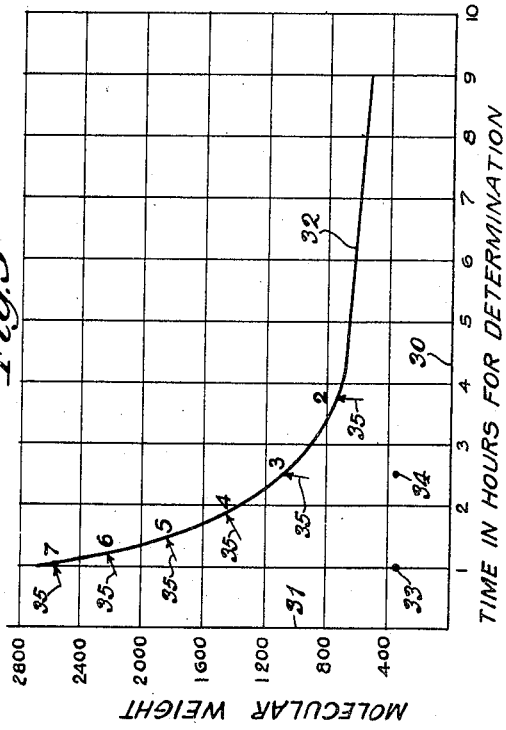
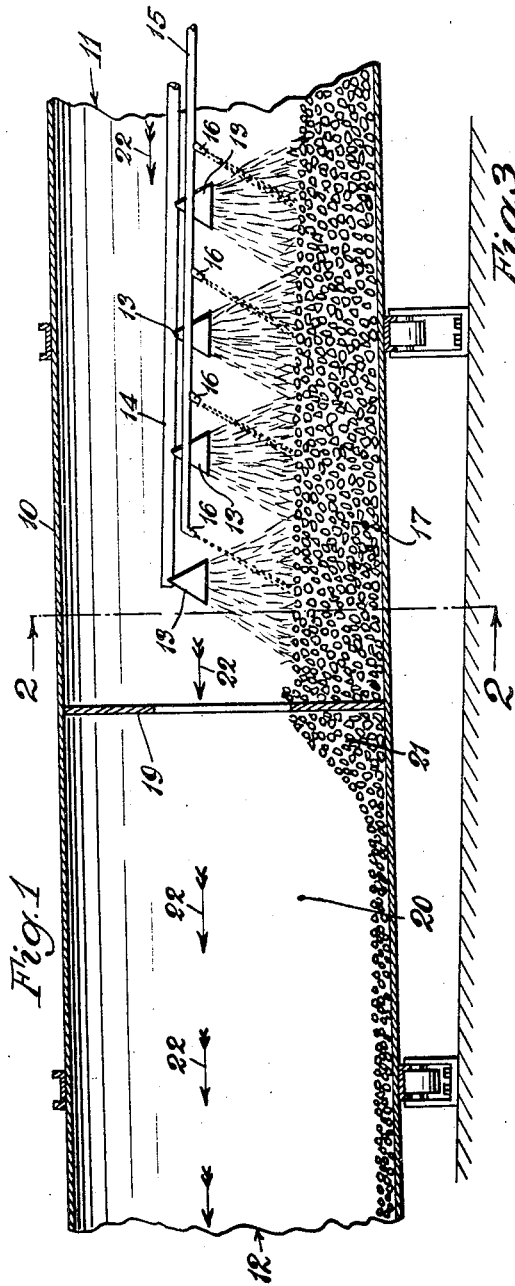
Inventor
Charles S. King
by W. Bartlett Jones,
Attorney.

Patented Apr. 15, 1947

2,419,148

UNITED STATES PATENT OFFICE 2,419,148

MANUFACTURE OF SODIUM TRIPHOSPHATES

Charles S. King, Joliet, Ill., assignor to Blockson Chemical Co., Joliet, Ill., a corporation of Illinois Application August 16, 1944, Serial No. 549,747

16 Claims. (Cl. 23—106)

1

The present invention relates to the manufacture of sodium polyphosphate and in particular to the manufacture of a crystalline salt containing units corresponding to the formula $Na_5P_3O_{10}$, and having a molecular weight greater than monomeric $Na_5P_3O_{10}$, and herein referred to as polymeric sodium triphosphate.

The name "sodium triphosphate" is a less well-known term than "sodium tripolyphosphate" for the same material. For the purposes of the present application, the latter term is discarded in favor of "sodium triphosphate," because a new form of the substance has been discovered, which appears to be a polymer of what the literature has heretofore defined as "sodium tripolyphosphate," and as "sodium triphosphate." The form described in the literature and other known forms appear to be a monomer having a molecular weight corresponding to the formula $Na_5P_3O_{10}$ in the anhydrous form, and to the formula $Na_5P_3O_{10}.6H_2O$ in the hydrated crystalline form.

In my earlier application Ser. No. 458,201, filed September 14, 1942, of which the present application is a continuation-in-part, there is described a process of making sodium polyphosphate in the form of sodium triphosphate, of which the formula is presently considered to be $Na_5P_3O_{10}$, and in said application termed sodium tripolyphosphate, by a procedure of heating a certain finely mixed solid salt mass without fusion at temperatures from 250° to 600° C., including formation of the mass to be heated, by flash-drying finely-divided aqueous solution having a content to provide said mass. Said application is generic to the present application.

The present invention relates to an anhydrous form believed to have the formula $(Na_5P_3O_{10})_x$, wherein $x$ has a value of at least 2, and wherein $x$ may have an average value of several values of $x$ where a mass is a mixture of several compositions of said formula differing in the values of $x$.

Evidence referred to hereinafter has indicated that $Na_5P_3O_{10}$ crystallized from a chilled fusion and $Na_5P_3O_{10}.6H_2O$ each have a molecular weight corresponding to a monomer $Na_5P_3O_{10}$, which latter has the properties ascribed to such material in the literature. The evidence also shows that the new materials herein described have much higher molecular weights, which may be made to drop and approach the said monomeric molecular weight. The evidence also shows that the higher-molecular-weight material has a higher solubility in water, and that both molecular weight and solubility may be made to drop together until the monomeric molecular weight and the solubility

2 ascribed in the literature to $Na_5P_3O_{10}$ are attained.

Evidence also shows that the high-molecular-weight material may be converted by controlled heat tempering to the mono-molecular-weight material having the solubility of the $Na_5P_3O_{10}$ of the literature, and as this tempering change proceeds, solubility in water decreases. The evidence also shows that stable water solutions of the new form may be treated so that the dissolved substance loses molecular weight, and forms monomeric $Na_5P_3O_{10}$ as crystals of $Na_5P_3O_{10}.6H_2O$, having the solubility of the monomeric $Na_5P_3O_{10}$.

Therefore, the present invention is based upon the discovery of high-molecular-weight forms of $(Na_5P_3O_{10})_x$ in which $x$ as an integer has many values and otherwise an average value over 1. For convenience and for scientific significance this new material is called a "polymeric" form, and the term "polymeric sodium triphosphate" has been applied. Thus, it will be understood why "poly-" has been dropped from the more common term "sodium tripolyphosphate."

It is therefore an object of the present invention to provide a form of sodium triphosphate having greater solubility in water than sodium triphosphate of the formula $(Na_5P_3O_{10})_1$ or $Na_5P_3O_{10}.6H_2O$.

It is an object of the present invention to provide sodium triphosphate of molecular weight greater than that of the formula $Na_5P_3O_{10})_1$.

It is also an object of the present invention to provide a mixture of such high-molecular-weight forms of sodium triphosphate.

It is a particular object of the invention to control the heating of an intimate mixture consisting of material in the proportion of 5 moles of $P_2O_5$ to 3 moles of $Na_2O$, so that one or more compounds of the supposed formula $(Na_5P_3O_{10})_x$ is formed, wherein $x$ has an average value greater than 1.

It is a particular object of the invention to provide a continuous process for the formation by heat of the said product.

It is a particular object to form a composition having useful chemical properties of monomeric $Na_5P_3O_{10}$, but having a greater solubility in water than monomeric $Na_5P_3O_{10}$, which composition is readily convertible when desired into monomeric $Na_5P_3O_{10}$.

Numerous other and ancillary objects and advantages of the present invention will become apparent from the following description and explanation of the invention by reference to process and product, and to the accompanying drawings in which:

Fig. 1 is a vertical longitudinal section of a cylindrical rotary furnace, in more or less diagrammatic representation.

Fig. 2 is a vertical cross-section of the furnace of Fig. 1, taken on the line 2—2 thereof.

Fig. 3 is a plot showing molecular weight determinations at different time intervals.

In said copending application Serial No. 458,201, filed September 14, 1942, there is described a new process of making sodium triphosphate. The exemplified operation of that process at temperatures above 500° C. makes the well-known form of sodium triphosphate, and I now know that the preferred operation of that process, makes a sodium triphosphate of the character herein referred to as "polymeric." This preferred operation is in a lower range of operable temperatures. As the temperature of operation increases to about 500° C. or over, and as the time of exposure at this temperature increases, a product having a lower molecular weight is obtained than is obtained at temperatures below about 450° C. A characteristic of the preferred process is quick and intimate mixture of reacting ingredients in dehydrated form at temperatures of about 300° C. or over. It is seemingly true that the compound $(Na_5P_3O_{10})_x$ is the one formed in the process, at lower temperatures under about 450° C. Heating this product above 500° C. causes it to reduce in molecular weight, but when chilled during this period of conversion, the change is arrested, and a polymeric product is secured having greater solubility than $(Na_5P_3O_{10})_1$ of the literature.

When formed at higher temperature of about 500° C. or over, the conversion is believed to be so rapid, if it exists at all, that the new form has not heretofore been discovered, and arrested in its change to provide it as a stable product.

Said prior application, among other disclosures, provides for making sodium triphosphate by a thermal reaction of solids employing initial reagents providing 5 moles of $Na_2O$ to 3 moles of $P_2O_5$, using any chemical raw materials which burn to an ash or solid salt mass of said composition, or which dehydrate to like solid salt residue. The invention contemplates that such ash or salt residue is rapidly formed as a fine or close admixture of minute particles which individually may not be of the same average composition of the entire mass. The physical state of aggregation in the evanescent mass undergoing thermal treatment is most important. Various materials may provide the reacting constituents, of which the following are exemplary:

(1) $NaPO_3 + Na_4P_2O_7 = Na_5P_3O_{10}$
(2) $NaH_2PO_4 + 2Na_2HPO_4 = Na_5P_3O_{10} + 2H_2O$

In any process of furnacing a solid mixture of reactants, it is customary to tumble the mass. Thus, reaction takes place at interfaces of the mixture where proportions are proper for reaction. As the product of reaction builds up, this insulates unreacted materials from each other, and further delays the process. A long time is required to attain completion of the reaction.

By the process of said generic application Serial No. 458,201, a solution of the materials to be used is finely divided and flash-dried, thus to form a solid infusible residue, ash, or salt mass, of intimately mixed solid reactants, wherein substantial homogeneity of proportion of $Na_2O$ to $P_2O_5$ exists for uniform and complete reaction throughout the mass, as distinguished from limited opportunistic interfacial reaction. Accordingly, the action of heat on a solid residue of flash-dried solution quickly effects and completes the reaction.

I have found that when the reaction is thus quickly effected at a controlled temperature in a mass having 5 moles of $Na_2O$ and 3 moles of $P_2O_5$, not as $Na_5P_3O_{10}$, the resulting reaction product initially formed has a molecular weight of the order of a high polymer. It is subject to reduction in molecular weight at temperatures over about 450° C. The reaction to form sodium triphosphate is slow at 250° C., being fast and practically momentary at about 300° C. and forming the highly soluble form at temperatures in the range from about 300° C. to about 450° C. The highly soluble form of the product is unstable at temperatures above about 450° C. under which conditions it is slowly transformed to monomeric form.

Sodium triphosphate of the form described in the literature at elevated temperatures has characteristic reactions or behavior. It is a crystalline anhydrous product with two physical forms in the solid state below its decomposition temperature of about 625° C. There is a critical or transition temperature of about 500° C. below which a form (I) which is stable from about 500° C. to 625° C. may be tempered to a form (II) which is stable below about 500° C. At temperatures above about 500° C. the latter form (II) may be tempered back to the form (I) which is stable from about 500° C. to 625° C. For convenience in this description, the form (II) of the prior art is herein designated as form (IIM) meaning the prior art form, and the new product is herein designated as form (IIP) meaning the product of the present invention.

Studies of the new form (IIP) show that it is stable at temperatures below a critical temperature between 450° C. and 500° C. and is convertible into the form (IIM) or form (I) according to the temperature, the form (IIM) being obtained at a temperature in the approximate range from 500° C. to 550° C., and the form (I) being obtained at temperatures upwardly from 550° C. to the melting point at about 625° C., at which the material melts and decomposes. The foregoing statements on transitions are directed to the material in the form (IIP) already formed, and not to materials in contact while effecting the essential chemical union, whether to form the prior art form or the new substance. The fact is that the forming ingredients must be so thoroughly and uniformly mixed that they react substantially momentarily at a temperature in the range from 300° C. to about 400° C. and preferably 300° C. to 325° C., to produce form (IIP) without substantial content of any other compound; and thereafter the resulting form (IIP) may be maintained for as much as 24 hours at temperatures up to about 450° C. without change from the form (IIP).

According to the operation of the preferred process for the present invention, the average temperature of the mass of material in the furnace never goes above the transition point of about 450° C., yet the gases in the furnace used for the process may have a much higher temperature.

The main reaction involves a redistribution of the oxides $Na_2O$ and $P_2O_5$ in the proportion of $5Na_2O$ and $3P_2O_5$. When the reacting oxides for a theoretical 100% yield are supplied, according to Reactions 1 and 2 given above, as a result of which there are two groups, one having a ratio of Na₂O to P₂O₅ of 1 to 1, and the other having a ratio of Na₂O to P₂O₅ of 2 to 1, the latter group must yield some of its Na₂O or must receive P₂O₅, or both actions occur together.

The integral bodies of these two groups are formed so as to have exceedingly minute size and to be so well mixed, that the effect of concentrating Na₂O in one group, and of concentrating P₂O₅ in the other group, thereby isolating each from reaction, is substantially avoided. It has as yet been impossible to ascertain whether the particle sizes are microscopic, submicroscopic, or substantially molecular in size. However, by the methods employed to produce the mixture, the fineness is such that the effects of coarseness of the mixture are avoided, these being low yield, and undesired NaPO₃ or undesired Na₄P₂O₇. The physical condition is expressed herein by the term "finely mixed." The condition may vary from intimate admixture to homogeneity.

A mixture of reacting salts or chemicals to provide Na₂O and P₂O₅ in the desired proportion, in solution in water is sprayed, or fed in a fine stream, or otherwise dispersed in fine liquid particles or small volumes, into or onto a very hot medium sufficient to flash-dry the solution and produce finely mixed ash or solid residue, preferably in fine particle sizes. The chemicals used are such as to provide only Na₂O and P₂O₅ in the ultimate residue, in the desired proportion. In the solution other components of the chemicals employed may exist, but they must be such as to be volatilized away and not retained in the ultimate solid residue. These may be $H_2O$, $CO_2$ or $NH_3$, or radicals such as oxalates, citrates and like volatile or "combustible" radicals. The solid particles of residue maintain their integrity and internal distribution of Na₂O and P₂O₅ in the proportion supplied by the liquid. Even though the particles may ball up or agglomerate, this is true. The solid residue, agglomerated or not, is then maintained at a temperature below about 450° C. to maintain the new form.

In carrying out the invention a strong solution of mixed salts or other chemicals is provided such as to give only Na₂O and P₂O₅ in the ultimate residue, and to give the desired ratio of Na₂O to P₂O₅.

The agents selected for dissolution may be two or more in number, and chosen in kind and quantity to produce the desired residue. Where only two agents are used there must be one selected from a group of agents, herein designated group A, in which P₂O₅ exceeds Na₂O, if present, by more than 3 moles of P₂O₅ to 5 moles of Na₂O; and the other agent must be selected from a group of agents, herein designated group B, in which Na₂O exceeds P₂O₅, if present, by more than 5 moles of Na₂O to 3 moles of P₂O₅. The following listings show suitable water-soluble salts or agents for such groups:

| Group A | Group B |
| --- | --- |
| NaH₂PO₄ | Na₂HPO₄ |
| NaH₃P₂O₇ | Na₃PO₄ |
| Na₂H₂P₂O₇ | Na₄P₂O₇ |
| Na₃HP₂O₇ | NaHCO₃ |
| NaPO₃ | Na₂CO₃ |
| P₂O₅ | NaOH |

However, it is to be understood that the invention is not limited to selection from groups A and B, nor are groups A and B limited to lists shown above. Extension of the lists, in view of the teachings herein made, will be obvious to those skilled in the art. It will also be obvious that extensions of the lists of available material, as to the combustible organic acid salts such as sodium oxalates, citrates, tartrates, or to the various ammonium phosphate salts, in general leads to the use of more expensive and more impractical agents.

Selected chemicals may be combined as in Reaction 1 whereby the molecular dehydration has occurred prior to dissolving. They may be provided according to Reaction 2, whereby the molecular dehydration of each is to be accomplished. For example, they may be provided to react as follows:

(3) 
$$NaPO_3 + 2Na_2HPO_4 = Na_5P_3O_{10} + H_2O$$

or (4) 
$$NaH_2PO_4 + Na_4P_2O_7 = Na_5P_3O_{10} + H_2O$$

It is preferred that they be provided as set forth in Reaction 2 from the commonplace orthophosphate salts, to be dehydrated in process. Such a solution is preferred with a strength at 50° Bé.

The desired solution is preferably used as a saturated one, to limit the amount of water to be evaporated. The strength of the solution will depend upon the selection of salts and the temperature at which it is held.

The solution may be sprayed upon a hot plate of 300° C. or more, but not over about 450° C., and preferably from 300° C. to 325° C., for example, where a small batch, as in a laboratory, is to be made. But in commercial operation a continuously operating furnace may be provided for the process in which the bed of salt residue itself provides the "hot plate." A suitable one is shown in the drawings.

Numeral 10 represents an inclined cylindrical rotary furnace with a slightly higher entry end 11 than discharge end 12. Oil or gas burners 13 on fuel line 14 at the entry end project hot flames downwardly toward the bottom interior. A solution feed line 15 parallels the fuel line and has nozzles 16, which introduce either a fine continuous stream, or which direct a mist of the solution, into the hot flame, thereby flash-drying it, and depositing particles of finely mixed solid residue to build up a bed designated 17.

An annular partition 19 divides the furnace into two sections including a flame section wherein a depth of bed 17 is created. Surplus material of the bed, as agglomerated particles, spills over the partition as the furnace is rotated and the material progresses through the remaining section 20 of the furnace as bed 21 to discharge end 12. Section 20 may receive fugitive material, such as spray particles from the flame section, and hence the temperature in section 20 is maintained over 300° C. and under about 450° C. to supplement the action primarily occurring in the flame section. A controlled current of air is passed through the furnace, as shown by arrows 22. The air stream is adjusted with respect to the burners in operation, to maintain the atmosphere in the flame section at about 550° C. to 625° C., and the amount of liquor introduced is such as to provide a bed 17 having a temperature safely below the critical temperature of about 450° C., and preferably at 300° C. to 325° C. In fact, because water is introduced with the spray, it is practically a difficult matter when operating the illustrated furnace at production capacity, to attain a temperature in the bed much over 325° C. These conditions produce in the discharge section 20 a bed temperature and an atmosphere temperature each at 325° C. to 375° C., at which temperature the material is discharged after about a one-hour passage through the furnace. These temperatures and conditions assure dehydration or reaction, or both, to convert substantially all the mass to the new composition.

After dehydration to effect an intimate mixture equivalent to one mole of $Na_4P_2O_7$ to one mole of $NaPO_3$, whatever the salts that are present, the reaction will take place slowly but appreciably where the temperature of the solid salt mass is about 250° C., but it is fast where its temperature is at least 300° C. and not over about 450° C., the fast reaction forming the more soluble high-molecular weight form. Therefore, it is preferred to use conditions providing a bed temperature of at least 300° C. and not over about 450° C., and preferably from 300° C. to 325° C., to insure complete and rapid reaction in the largest agglomerates in the bed 17.

The temperature where the solution is introduced is not critical for reaction purposes, but is such, depending upon the size and amount of spray particles being introduced, as to effect a substantial flash-drying of the particles and formation of sufficiently hot solid flash-dried residue, whereby to avoid depositing liquid from which slow evaporation and fractional crystallization could occur in the bed 17, and whereby to form and deposit a thoroughly and intimately mixed mass at a temperature to assure quick reaction.

The functional effect value of flash-drying the liquid has been demonstrated by the following procedure:

A solution of 55% by weight of solids corresponding analytically in ash to $Na_5P_3O_{10}$ and made from monosodium orthophosphate and disodium orthophosphate, was dropped in a fine stream from a pipette upon a hot plate having initially a temperature of about 400° C. to effect flash-drying and to leave heated solid salt residue. The amounts of liquid used were increased in a series thereby cooling the hot plate in the series as the quantity of liquid was increased, and thereby attaining a correspondingly cooler salt residue. This was effected in the presence of a sensitive thermocouple arranged to show the temperature of the salt mass. Various times of spraying were thus used, and the time was measured which was required to raise each batch of salt residue first to 200° C. and then to 300° C. Some of the residues indicated incomplete dehydration at 300° C. at which temperature all were removed from the hot plate. Then a portion of each, including any still moist with a slight amount of water content, was transferred to a platinum dish and heated at 375° C. for one hour. The insoluble content in the resulting solid mass was determined.

The results were as follows:

| Item | Minutes to Attain— | | Per Cent Insoluble Content in Ash |
|---|---|---|---|
| | 200° C. | 300° C. | |
| A | 4 | 7 | 2.13 |
| B | 3 | | 1.20 |
| C | 1 | | Trace |
| D | 0.5 | 1.0 | None |

Items C and D only as taken from the hot plate were substantially 100% of compound corresponding to the formula $(Na_5P_3O_{10})_x$. Items A and B exhibited segregation, as a result of which reaction was incomplete and sodium metaphosphate remained which is manifested by the presence of insoluble substance.

The insoluble substance was the insoluble form of sodium metaphosphate, formed in the subsequent heating. The quick formation of the salt mass at 300° C. was therefore essential to complete conversion to said sodium triphosphate with no insoluble content.

In the foregoing process, I have found that when the salt-mass temperature is high, such as at 600° C., the sodium triphosphate is monomeric, and has the characteristic solubility of such. When the temperature is substantially below 450° C., as in the preferred range, the solubility is much higher and more or less than twice as high. With these two products, differing greatly in solubility, at least two chemical properties are the same, namely, the ability to sequester calcium hardness in water, and the pH in water solutions of the same concentration. Examples of properties of the polymer which are different in the monomer are: molecular weight, the solubility in water, the transition at about 500° C., and the convertibility of the apparent polymer to the well-known monomer.

As the high-molecular-weight form of sodium triphosphate of the present invention progressively converts to a lower-molecular-weight form, the solubility values decrease. Hence, the solubility is hereinafter referred to as the immediate solubility (I. S.) in water, to give an indication of the relative degree of the so-called polymerization. Immediate solubility as used herein, is the number of grams of the material immediately soluble in distilled water to form 100 grams of solution at 25° C. Huber (Z. Angew. Chem., vol. 50, page 323 for 1937) gives the solubility of $Na_5P_3O_{10}$ at room temperature as 1 part in 5.5 parts of water, which is an immediate solubility of 15.4 in terms above given. Reported solubilities in the literature vary slightly but hover around this value.

I have determined that the immediate solubilities of $Na_5P_3O_{10}$ of the said forms stable above 500° C. and below 500° C. (identified in the literature respectively as forms I and II) is approximately 15. This is the same as the percentage strength in term of $Na_5P_3O_{10}$ of solution that can be formed from $Na_5P_3O_{10}.6H_2O$, clearly indicating that the latter salt and the forms I and II are of the same molecular-weight form, no doubt, monomeric.

By the preferred furnace process above described a product is obtained having an immediate solubility of 26 to 32.5. These values can be changed, because the supposed depolymerization may be initiated and controlled. Said depolymerization in the presence of water is influenced, I believe, by the presence or the concentration of sodium ions. Sodium chloride accelerates it. The ultimate product of the supposed depolymerization may approach saturation in the solution and then crystallize out as

$Na_5P_3O_{10}.6H_2O$ and the solution which remains is saturated with $Na_5P_3O_{10}.6H_2O$ and approaches a saturated solution consisting only of dissolved $Na_5P_3O_{10}.6H_2O$ as the conversion approaches its end.

Only the higher range of concentrations of solution of the new product will effect precipitation of the hydrated crystals. The following general statements of operations at room temperature of 20° C. to 25° C. will illustrate important properties of the new product. A 20% solution by weight of 20 parts of the new salt per 100 of solution (per 80 of water) does not precipitate any crystals over a period of several months, and is thus relatively stable. A stronger solution of 26% to 28% in about 16 hours will precipitate some crystals of $Na_5P_3O_{10}.6H_2O$. Sodium salts added to the solution hasten the deposition of such crystals. Sodium chloride added to an approximately saturated solution of the new salt will salt out about 95% of it as hydrated crystals. Addition of crystals of $Na_5P_3O_{10}.6H_2O$ to a solution stronger than 17% will cause the supposed depolymerization to initiate and proceed. I am thus led to believe that it is the heavier concentration of the sodium ion which is active to induce the supposed depolymerization, and I believe that in said 20% solution, the sodium ion is not of sufficiently high concentration for this activity, making the solution stable. Evidence also indicates that the existence of crystals of the hydrated form in a solution of the new form initiates and leads the supposed depolymerization ahead of its natural tendency otherwise to proceed.

As an indication of a conversion while in solution at 25° C., with agitation, the following examples are given.

Table I

| Ex. | Form of $Na_5P_3O_{10}$ | Hours Heated | at ° C. | Immediate Solubility | Grams initially dissolved in 100 gm. of solution | After 16 Hours Standing, Grams dissolved in 100 gm. of solution |
|---|---|---|---|---|---|---|
| 1 | (I) | | | | 15 | 13.2 |
| 2 | (IIM) | | | 15 | 15 | 15 |
| 3 | (IIP) | 4 | 325 | 28 | 28 | 17.4 |
| 4 | (IIP) | 4 | 325 | 28 | 20 | 20 |
| 5 | (IIP) | 16 | 500 | 17 | 17 | 13.5 |
| 6 | (IIP) | 6 | 550 | 16 | 16 | 14.9 |

In Table I, all except Examples 2 and 4 precipitated crystals in 16 hours. Table I shows that the solubility of Examples 1 and 2 is that of monomeric material, and that Examples 3 and 4 are high-molecular-weight forms with greater solubility which convert in concentrated solution to a form which is or approaches the monomeric form. Examples 5 and 6 show how heating the high-molecular-weight form at 500° C. or over also effects a conversion substantially to the monomeric form.

In order to show the effect of extended heating of the high-molecular-weight form made by the preferred process above given, a quantity of material was taken directly from the furnace and divided into six batches identified as A, B, C, D, E and F. Five of these (A excepted) were heated for 24 hours at varying temperatures, and then the immediate solubilities of the six batches were determined as follows:

Table II

| Batch | Temperature, ° C. | Immediate Solubility |
|---|---|---|
| A | (Blank) | 32.5 |
| B | 350 | 32.5 |
| C | 400 | 32.5 |
| D | 450 | 32.5 |
| E | 500 | 19.3 |
| F | 550 | 18.7 |

These results and much other experience establish that the critical transition temperature for reduction in molecular weight to set in by thermal effect is somewhere between 450° C. and 500° C.

As to the degree of supposed polymeric form, it is difficult to determine the truth. However, a degree of polymerization is indicated. Methods for determining molecular weights of fixed compositions are not universally applicable to polymers to determine polymeric molecular weights. The tendency of the so-called polymer apparently to de-polymerize has been shown to be strong, to be influenced by sodium ions, to be influenced by tempering exposure, and to be influenced by the presence of crystalline monomer.

The cryoscopic method of determining molecular weight, using $Na_2SO_4.10H_2O$ is not perfect for the product of the present invention, but it has been used and shows the existence of molecular weights corresponding to polymers. It shows also changing molecular weight with time, and from the time curve of molecular weight it is concluded that an initial molecular weight prevails which is well above a polymer corresponding to 7 units.

This method has been used by Bonneman (Compte Ren. vol. 204, p. 443 of 1937) to determine the molecular weight of $Na_5P_3O_{10}$. He reported 375 as the average of his determinations. The formula weight is 368. The original technique of Lowenhertz (Z. Physik. Chem., vol. 18, p. 70 of 1895) has been modified by Pierret (Bull. Soc. Chim., vol. 39, p. 590 of 1926). As so modified it has been employed for the results given below.

A quantity of the order of 1 to 3 grams of sodium triphosphate to be tested for its possible polymeric form through its molecular weight, is placed in a quantity on the order of 45 grams of $Na_2SO_4.10H_2O$, at near 32° C. The depression of the freezing point of 100% $Na_2SO_4.10H_2O$, effected by the added sodium triphosphate, gives the average molecular weight of the dissolved salt being tested as the molecular weight exists at the time the measurement is taken. If there is change in the molecular weight it can be followed. The time from the beginning of the mixture to the time of measurement includes mixing time and time in which the materials are homogeneously mixed.

Using hydrated $Na_5P_3O_{10}.6H_2O$ and using also form (IIM) the method gives for each, a molecular weight of about 375, clearly indicating a monomeric form. Also these do not change in the test period of about 9 hours which is employed in obtaining Fig. 3.

Fig. 3 is the result of using a form having a high immediate solubility of 29 as produced by the preferred procedure described. The axis 30 designates the scale of hours at the reading from mixing to performance of the test. Axis 31 represents the scale of molecular weight. Curve 32 represents determined molecular weights at various times. Point 33 represents the time of determination and the molecular weight of 375 in terms of anhydrous product for $Na_5P_3O_{10}.6H_2O$. Point 34 represents the time of determination and the molecular weight of 375 for $Na_5P_3O_{10}$ (IIM).

Curve 32 shows a change of molecular weight and the arrows 35 are related to numerals corresponding to the number of the supposed polymer corresponding to that molecular weight. It is seen that in the period after the first hour and up to the fourth hour of the test, the supposed depolymerization is rapid, the curve then flattening off and approaching the monomer. The knee of the curve is around the dimer. From the law of mass action it might be expected that a single high polymer would break up, not by losing one unit at a time, but by breaking down more or less evenly until all the content is dimer. However, this is merely conjecture. Then the dimer would break down much slower into the monomer, because of the repressing action of the monomer formed.

The curve shows that after about 4 hours under the test conditions, the product averages as a dimer, while at the first hour, it averages above a heptamer. The rate of fall indicates that initially there must have been a polymer very much higher than a heptamer, but how much, is presently not known.

By another refinement of such a cryoscopic testing method, results have been obtained with various forms of sodium triphosphate of which the immediate solubility is known. The test does not, however, give the true molecular weight and likewise permits of some reduction in molecular weight before the data is taken for the calculation. Comparable molecular weights and immediate solubilities, determined with these possible departures from a true relationship, are:

| Specimens | Molecular Weight | Immediate Solubility |
| --- | --- | --- |
| (a) | 28,000 | 32.5 |
| (b) | 1,060 | 19.3 |
| (c) | 490 | 18.7 |

Specimen (a) is the form (IIP) made by the preferred process described. Specimens (b) and (c) are specimen (a) after heating for 24 hours respectively at 500° C. and 550° C., both being the specimens described hereinabove. The specimen (a) corresponds in the molecular weight determined, to a polymer $(Na_5P_3O_{10})_x$ in which $x$ has a value of 76. Thus, the supposed polymer which is made by the preferred process indicates a value of $x$ having at least two digits.

X-ray diffraction spectra of the monomeric form $Na_5P_3O_{10}$ (IIM) and of the high-molecular-weight forms have been made with specially refined equipment and the two patterns have the same generalized characteristics. With less refined spectral equipment the patterns appear the same. In the more refined tests the ordinary outer patterns are identical, and the pattern of a supposed polymer can be distinguished from the pattern of the form (IIM) by the former effecting small angular scatterings of angular ranges, which in accordance with well developed principles in X-ray diffraction, prove the existence of large polymer molecules distributed over a range of sizes with a calculated average molecular weight of about 20,000 for the specimen tested. Evidence of but a single polymer has been lacking, with all the evidence pointing to a mixture of many polymers. The form (IIM) and the supposed polymer both show evidence of the same crystal unit throughout, which must be that of $(Na_5P_3O_{10})_1$.

The new form may be used as a water-treating agent, as for softening, or sequestration, or inhibition, for which functions the monomer is useful. It may be used as a wetting agent, or as a mild alkaline agent. It is excellent as a bath salt or a component of bath salts.

The new form may be used as a detergent, having a pH of 9.8 in 1% solution in water at 25° C. It also may be used as a component of detergent compositions, as with soap, or other materials such as:

*Formula 1*

| | Parts by weight |
| --- | --- |
| Sodium triphosphate (I. S. 28) | 35 |
| Trisodium phosphate ($Na_3PO_4.12H_2O$) | 35 |
| Sodium metasilicate ($Na_2SiO_3.9H_2O$) | 30 |

*Formula 2*

| | Parts by weight |
| --- | --- |
| Sodium stearate | 90 |
| Sodium triphosphate (I. S. 26 to 32.5) | 10 |

This is a soap composition in which the sodium triphosphate is thoroughly incorporated into the soap, as in cake, flake or powder form.

*Formula 3*

| | Parts by weight |
| --- | --- |
| Calcium hypochlorite (available chlorine 50%) | 8 |
| Sodium triphosphate (I. S. 26 to 32.5) | 92 |

The triphosphate effects solution of the hypochlorite and gives clear solutions with hard water.

Of itself, the sodium triphosphate of the present invention and that of the prior art, are mildly active as wetting agents and are mildly alkaline. Hence, when used alone, the new product provides a mildly alkaline wetting solution, and when used with strong wetting agents, it provides a mildly alkaline strongly wetting solution. Thus, for household pan dish-washing, any form of sodium triphosphate is an excellent substitute for soap, because of its alkalinity and detergent value. But it provides no suds. Housewives want suds, regardless of lack of function of the suds. Hence, a mixture of the sodium triphosphate of the present invention with a foaming agent, such as saponin, or lauryl sulfonate salt, or other alkyl or aryl sulfonate salts which foam readily in alkaline solution, is an excellent soap substitute for dishwashing, and for other household purposes, such as laundering, washing walls, painted surfaces, etc. The following illustrates:

*Formula 4*

| | Parts by weight |
| --- | --- |
| Sodium lauryl sulfonate | 10 |
| Sodium triphosphate (I. S. 26 to 32.5) | 90 |

In well-drilling muds it may be used instead of sodium metaphosphate or sodium pyrophosphate, to effect a reduction of viscosity of the mud.

In many commercial arts, such as kier-boiling, washing paper mill felts, and the like, the sodium triphosphate of the present invention may be used because of its mild alkalinity, its wetting value and its detergent properties.

The invention concerns the new and supposed polymeric-form of sodium triphosphate, both as a solid, and as a solute in any stable solution thereof such as those which are not over 20% by weight in strength; and it also concerns methods of making the said new product.

Numerous procedures including modifications of and departures from the illustrative process above described, are contemplated as falling within the scope of the invention as set forth in the appended claims.

I claim:

1. The method of producing a form of sodium triphosphate having greater immediate solubility and higher molecular weight in terms of $Na_5P_3O_{10}$ than has the compound $Na_5P_3O_{10}.6H_2O$ expressed in terms of $Na_5P_3O_{10}$, which comprises flash-drying finely divided aqueous solution containing at least one compound of $Na_2O$ and at least another compound of $P_2O_5$ all of said compounds being present in quantity to provide material in the proportion of 5 moles of $Na_2O$ to 3 moles of $P_2O_5$ which solution is capable of providing a solid salt residue infusible in the process steps hereof and ultimately consisting analytically of 5 moles of $Na_2O$ and 3 moles of $P_2O_5$, heating the resulting finely mixed residue at a reaction temperature in the range from 300° C. to about 450° C. whereby to effect reaction in the residue to combine the said analytical contents of $Na_2O$ and $P_2O_5$, and thereafter maintaining the temperature of the resulting product below a temperature of about 450° C.

2. The method of producing a form of sodium triphosphate having greater immediate solubility and higher molecular weight in terms of $Na_5P_3O_{10}$ than has the compound $Na_5P_3O_{10}.6H_2O$ expressed in terms of $Na_5P_3O_{10}$, which comprises flash-drying finely divided aqueous solution containing at least one compound of $Na_2O$ and at least another compound of $P_2O_5$ all of said compounds being present in quantity to provide material in the proportion of 5 moles of $Na_2O$ to 3 moles of $P_2O_5$ which solution is capable of providing a solid salt residue infusible in the process steps hereof and ultimately consisting analytically of 5 moles of $Na_2O$ and 3 moles of $P_2O_5$, heating the resulting finely mixed residue at a reaction temperature in the range from 300° C. to about 450° C. whereby substantially immediately to effect reaction in the residue to combine the said analytical contents of $Na_2O$ and $P_2O_5$, and thereafter maintaining the temperature of the resulting product below a temperature of about 450° C.

3. The method of producing a form of sodium triphosphate having greater solubility and higher molecular weight in terms of $Na_5P_3O_{10}$ than the compound $Na_5P_3O_{10}.6H_2O$, which comprises continuously flash-drying a supply of finely divided aqueous solution containing at least one compound of $Na_2O$ and at least another compound of $P_2O_5$ all of said compounds being present in quantity to provide material in the proportion of 5 moles of $Na_2O$ to 3 moles of $P_2O_5$ which solution is capable of providing a solid salt residue infusible in the process steps hereof and ultimately consisting analytically of 5 moles of $Na_2O$ and 3 moles of $P_2O_5$, immediately incorporating the resulting finely mixed residue into a moving advancing bed of solid salt residue analytically consisting substantially of 5 moles of $Na_2O$ and 3 moles of $P_2O_5$ at a temperature in the range from 300° C. to 325° C. whereby the material so added to said bed reacts to combine 5 molar parts of $Na_2O$ with 3 molar parts of $P_2O_5$, advancing said bed away from the region of the material being added to it and maintaining the portion of the bed removed from said region at a temperature in the range from 300° C. to 375° C., and thereafter maintaining the temperature of the resulting product below a temperature of about 450° C.

4. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt residue analytically consisting substantially of 5 moles of $Na_2O$ and 3 moles of $P_2O_5$ by application of a region of flame thereto and thereby maintaining the temperature of the bed in the range from 300° C. to about 450° C., feeding into and through said region of flame finely divided aqueous solution containing dissolved material comprising bed-forming content which latter consists analytically of 5 moles of $Na_2O$ and 3 moles of $P_2O_5$, whereby said solution is converted to finely mixed solid salt residue to form and maintain said bed, advancing said bed to move material therein out of the region of the flame and maintaining said advancing bed material at a temperature in said range, whereby the residue reacts to combine the $P_2O_5$ and $Na_2O$ contents thereof in the proportion of 5 molar parts of $Na_2O$ with 3 molar parts of $P_2O_5$, and maintaining the temperature of the resulting bed material below a temperature of about 450° C.

5. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt residue analytically consisting substantially of 5 moles of $Na_2O$ and 3 moles of $P_2O_5$ by application of a region of flame thereto and thereby maintaining the temperature of the bed in the range from 300° C. to about 450° C., feeding into and through said region of flame finely divided aqueous solution containing dissolved solute consisting of monosodium orthophosphate and disodium orthophosphate in proportion to provide 5 moles of $Na_2O$ and 3 moles of $P_2O_5$, whereby said solution is converted to finely mixed solid salt residue to form and maintain said bed, advancing said bed to move material therein out of the region of the flame and maintaining said advancing bed of material at a temperature in said range, whereby the residue reacts to combine the $Na_2O$ and $P_2O_5$ contents thereof in the proportion of 5 molar parts of $Na_2O$ with 3 molar parts of $P_2O_5$, and maintaining the temperature of the resulting bed material below a temperature of about 450° C.

6. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt residues analytically consisting substantially of 5 moles of $Na_2O$ and 3 moles of $P_2O_5$ by application of a region of flame thereto and thereby maintaining the temperature of the bed in the range from 300° C. to 325° C., feeding into and through said region of flame finely divided aqueous solution containing dissolved solute consisting of monosodium orthophosphate and disodium orthophosphate in proportion to provide 5 moles of $Na_2O$ and 3 moles of $P_2O_5$, whereby said solution is converted to finely mixed solid salt residue to form and maintain said bed, advancing said bed to move material therein out of the region of the flame and maintaining said advancing bed of material at a temperature in said range, whereby the residue reacts to combine the $Na_2O$ and $P_2O_5$ contents thereof in the proportion of 5 molar parts of $Na_2O$ with 3 molar parts of $P_2O_5$, and maintaining the temperature of the resulting bed material below a temperature of about 450° C.

7. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt residue analytically consisting substantially of 5 moles of $Na_2O$ and 3 moles of $P_2O_5$ by application of a region of flame thereto and thereby maintaining the temperature of the bed in the range from 300° C. to about 450° C., feeding into and through said region of flame finely divided aqueous solution containing dissolved solute consisting of salt having a content of $Na_2O$ and $P_2O_5$ in the ratio of $1Na_2O$ to $1P_2O_5$ and other salt having a content of $Na_2O$ and $P_2O_5$ in the ratio of $2Na_2O$ to $1P_2O_5$ which solute consists analytically of 5 moles of $Na_2O$ and 3 moles of $P_2O_5$, whereby said solution is converted to finely mixed solid salt residue to form and maintain said bed, advancing said bed to move material therein out of the region of the flame and maintaining said advancing bed of material at a temperature in said range, whereby the residue reacts to combine the $Na_2O$ and $P_2O_5$ contents thereof in the proportion of 5 molar parts of $Na_2O$ with 3 molar parts of $P_2O_5$, and maintaining the temperature of the resulting bed material below a temperature of about 450° C.

8. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt mass by application to the trailing end thereof of a region of flame producing an atmosphere having a temperature above 300° C. and below 625° C., feeding continuously into and through said atmosphere a quantity of finely divided aqueous solution containing dissolved material comprising bed-forming content which latter consists analytically of 5 moles of $Na_2O$ and 3 moles of $P_2O_5$ whereby said solution is converted to finely mixed solid salt residue to form and maintain said bed, advancing said bed to move material therein away from said atmosphere, conducting the exhaust gases from said region of flame over and along said bed in the direction of advance, and regulating both the supply of heat from the region of flame and the rate of feed of said solution to maintain the entire bed at a temperature in the range from 300° C. to about 450° C. whereby the bed material reacts to combine the $Na_2O$ and $P_2O_5$ contents thereof into a form consisting of units corresponding to $Na_5P_3O_{10}$, and thereafter maintaining the temperature of the reaction product below a temperature of about 450° C.

9. The method of producing a form of sodium triphosphate having greater solubility and higher molecular weight in terms of $Na_5P_3O_{10}$ than the compound $Na_5P_3O_{10}.6H_2O$, which comprises heating an advancing bed of solid salt mass by application to the trailing end thereof of a region of flame producing an atmosphere having a temperature above 300° C. and below 625° C., feeding continuously into and through said atmosphere a quantity of finely divided aqueous solution containing dissolved material comprising bed-forming content which latter consists analytically of 5 moles of $Na_2O$ and 3 moles of $P_2O_5$ whereby said solution is converted to finely-mixed solid salt residue to form and maintain said bed, advancing said bed to move material therein away from the said atmosphere, conducting the exhaust gases from said flame over and along said bed in the direction of advance, and regulating both the supply of heat from the region of flame and the rate of feed of said solution to maintain the entire bed at a temperature above 300° C. and below about 375° C. whereby the salt mass of the bed reacts to combine the $Na_2O$ and $P_2O_5$ contents thereof into a form consisting of units corresponding to $Na_5P_3O_{10}$, and cooling said material from the bed to normal temperature to provide a supply thereof.

10. The method of producing a form of sodium triphosphate having greater solubility and higher molecular weight in terms of $Na_5P_3O_{10}$ than the compound $Na_5P_3O_{10}.6H_2O$, which comprises forming a solution in water of salt having a content of $Na_2O$ and $P_2O_5$ in the ratio of $1Na_2O$ to $1P_2O_5$ and of other salt having a content of $Na_2O$ and $P_2O_5$ in the ratio of $2Na_2O$ to $1P_2O_5$, said solution having a composition to provide the hereinafter-mentioned solid salt residue infusible at temperatures up to about 450° C. which residue ultimately consists analytically of 5 moles of $Na_2O$ and 3 moles of $P_2O_5$, finely dividing the solution, flash-drying the finely divided solution so as to provide said solid residue in finely-mixed form, and heating said residue at a temperature in the range from 300° C. to about 450° C. whereby to cause the mixed content of the residue to react to a form consisting of units corresponding to $Na_5P_3O_{10}$, and thereafter maintaining the temperature of the reaction product below a temperature of about 450° C.

11. The method of producing a form of sodium triphosphate having greater solubility and higher molecular weight in terms of $Na_5P_3O_{10}$ than the compound $Na_5P_3O_{10}.6H_2O$, which comprises forming a solution in water of salt having a content of $Na_2O$ and of $P_2O_5$ in the ratio of $1Na_2O$ to $1P_2O_5$ and of other salt having a content of $Na_2O$ and $P_2O_5$ in the ratio of $2Na_2O$ to $1P_2O_5$, said solution having a composition to provide the hereinafter-mentioned solid salt residue infusible at temperatures up to about 450° C. which residue ultimately consists analytically of 5 moles of $Na_2O$ and 3 moles of $P_2O_5$, finely dividing the solution, flash-drying the finely divided solution so as to provide said solid residue in finely mixed form, and heating said residue at a temperature in the range from 300° C. to 325° C. whereby the mixed content of the residue reacts substantially immediately to a form consisting of units corresponding to $Na_5P_3O_{10}$, and thereafter maintaining the temperature of the reaction product below a temperature of about 450° C.

12. The method of producing a form of sodium triphosphate having greater solubility and higher molecular weight in terms of $Na_5P_3O_{10}$ than the compound $Na_5P_3O_{10}.6H_2O$, which comprises forming a solution in water of monosodium orthophosphate and of disodium orthophosphate, said solution having a composition to provide the hereinafter-mentioned solid salt residue infusible at temperatures up to about 450° C. which residue ultimately consists analytically of 5 moles of $Na_2O$ and 3 moles of $P_2O_5$, finely dividing the solution, flash-drying the finely divided solution so as to provide said solid residue in finely mixed form, and heating said residue at a temperature in the range from 300° C. to about 450° C. whereby to cause the mixed content of the residue to react to a form consisting of units corresponding to $Na_5P_3O_{10}$, and thereafter maintaining the temperature of the reaction product below a temperature of about 450° C.

13. The method of producing a form of sodium triphosphate having greater solubility and higher molecular weight in terms of $Na_5P_3O_{10}$ than the compound $Na_5P_3O_{10}.6H_2O$, which comprises forming a solution in water of monosodium orthophosphate and of disodium orthophosphate, said solution having a composition to provide the hereinafter-mentioned solid salt residue infusible at temperatures up to about 450° C. which residue ultimately consists analytically of 5 moles of $Na_2O$ and 3 moles of $P_2O_5$, finely dividing the solution, flash-drying the finely divided solution so as to provide said solid residue in finely-mixed form, and heating said residue at a temperature in the range from 300° C. to 325° C. whereby the mixed content of the residue reacts substantially immediately to a form consisting of units corresponding to $Na_5P_3O_{10}$, and thereafter maintaining the temperature of the reaction product below a temperature of about 450° C.

14. A composition of matter consisting analytically of $Na_2O$ and $P_2O_5$ in the molar ratio of 5 to 3 respectively and in chemical combination corresponding to the formaula $(Na_5P_3O_{10})_x$ in which $x$ has an average value in excess of 1, said composition being characterized by a crystalline structure and by having an immediate solubility in water and an average molecular weight, both greater than those of monomeric sodium triphosphate of the formula $(Na_5P_3O_{10})_1$, said immediate solubility being in the range from about 19 to 32.5 as expressed in terms of grams in distilled water to form 100 grams of saturated solution at 25° C., and said molecular weight being at least in the range from 1,000 to 28,000, and further characterized by conversion toward and to said monomeric form on continued heating without decomposition of sodium triphosphate at temperatures upwardly from at least 500° C. and below 625° C., with attendant reduction of immediate solubility to a value which is upwardly from about 15 and substantially below 19, and with attendant reduction of the average molecular weight paralleling the reduction of immediate solubility, to a true value which is at least 368 corresponding to said monomeric form.

15. A composition of matter consisting analytically of $Na_2O$ and $P_2O_5$ in the molar ratio of 5 to 3 respectively and in chemical combination corresponding to the formula $(Na_5P_3O_{10})_x$ in which $x$ has an average value in excess of 1, said composition being characterized by a crystalline structure and by having an immediate solubility in water and an average molecular weight, both greater than those of monomeric sodium triphosphate of the formula $(Na_5P_3O_{10})_1$, said immediate solubility being in the range from 26 to 32.5 as expressed in terms of grams in distilled water to form 100 grams of saturated solution at 25° C., and said molecular weight being at least in the range from 2,600 to 28,000, and further characterized by conversion toward and to said monomeric form on continued heating without decomposition of sodium triphosphate at temperatures upwardly from at least 500° C. and below 625° C., with attendant reduction of immediate solubility to a value which is upwardly from about 15 and substantially below 26, and with attendant reduction of the average molecular weight paralleling the reduction of immediate solubility, to a true value which is at least 368 corresponding to said monomeric form.

16. A composition of matter consisting analytically of $Na_2O$ and $P_2O_5$ in the molar ratio of 5 to 3 respectively and in chemical combination corresponding to the formula $(Na_5P_3O_{10})_x$ in in which $x$ has an average value in excess of 1, said composition being characterized by a crystalline structure and by having an immediate solubility in water and an average molecular weight, both greater than those of monomeric sodium triphosphate of the formula $(Na_5P_3O_{10})_1$, said immediate solubility being about 32.5 as expressed in terms of grams in distilled water to form 100 grams of saturated solution at 25° C., and said molecular weight being at least 28,000, and further characterized by conversion toward and to said monomeric form on continued heating without decomposition of sodium triphosphate at temperatures upwardly from at least 500° C. and below 625° C., with attendant reduction of immediate solubility to a value which is upwardly from about 15 and substantially below 32.5, and with attendant reduction of the average molecular weight paralleling the reduction of immediate solubility, to a true value which is at least 368 corresponding to said monomeric form.

CHARLES S. KING.

REFERENCES CITED

The following references are of record in the file of this patent:

UNITED STATES PATENTS

| Number | Name | Date |
|---|---|---|
| 1,935,474 | Taubi | Nov. 14, 1933 |
| 2,109,811 | Welter | Mar. 1, 1938 |
| 2,295,831 | Caryl | Sept. 15, 1942 |
| 2,365,190 | Hatch | Dec. 19, 1944 |
| 2,374,100 | Jackson | Apr. 17, 1945 |

FOREIGN PATENTS

| Number | Country | Date |
|---|---|---|
| 441,474 | British | Jan. 20, 1936 |

OTHER REFERENCES

Partridge et al., J. Am. Chem. Soc., vol. 63, 1941, page 461.

Huber, Z. Angew Chem., vol. 50; #18, 1937, page 324.

Certificate of Correction

Patent No. 2,419,148. April 15, 1947.

CHARLES S. KING

It is hereby certified that errors appear in the printed specification of the above numbered patent requiring correction as follows: Column 4, line 57, for "400° C." read *450° C.*; column 7, line 37, strike out the word "value"; column 10, line 35, for "of" after "quantity" read *on*; column 14, line 45, claim 6, for "residues" read *residue*; column 18, line 53, after the numeral and period "324." insert the following reference— *P. Bonneman-Bemia, Annales De Chimie, Vol. 16, pages 416 to 425 (1941).*; and that the said Letters Patent should be read with these corrections therein that the same may conform to the record of the case in the Patent Office.

Signed and sealed this 10th day of June, A. D. 1947.

[SEAL]

LESLIE FRAZER,
*First Assistant Commissioner of Patents.*